(12) United States Patent
Oh

(10) Patent No.: US 7,761,104 B2
(45) Date of Patent: Jul. 20, 2010

(54) METHOD FOR TRANSMITTING A CHARACTER MESSAGE FROM MOBILE COMMUNICATION TERMINAL

(75) Inventor: Chang-Min Oh, Kumi-shi (KR)

(73) Assignee: Samsung Electronics Co., Ltd (KR)

( * ) Notice: Subject to any disclaimer, the term of this patent is extended or adjusted under 35 U.S.C. 154(b) by 588 days.

(21) Appl. No.: 10/302,113

(22) Filed: Nov. 22, 2002

(65) Prior Publication Data

US 2004/0192356 A1 Sep. 30, 2004

(30) Foreign Application Priority Data

Apr. 9, 2002 (KR) .............................. 2002-19151

(51) Int. Cl.
*H04B 1/04* (2006.01)
*H01Q 11/12* (2006.01)
*H04W 4/00* (2009.01)
*H04M 3/42* (2006.01)

(52) U.S. Cl. ................. 455/466; 455/414.1; 455/417; 379/210.01; 379/211.01

(58) Field of Classification Search .............. 455/466, 455/412, 414.1, 417; 379/211.01, 210.01, 379/310.01
See application file for complete search history.

(56) References Cited

U.S. PATENT DOCUMENTS

| 5,794,142 | A | * | 8/1998 | Vanttila et al. | 455/419 |
|---|---|---|---|---|---|
| 5,915,222 | A | * | 6/1999 | Olsson et al. | 455/466 |
| 5,920,826 | A | * | 7/1999 | Metso et al. | 455/557 |
| 5,943,399 | A | * | 8/1999 | Bannister et al. | 379/88.17 |
| 6,044,278 | A | * | 3/2000 | Goto et al. | 455/422.1 |
| 6,070,055 | A | * | 5/2000 | Uchida | 455/701 |
| 6,154,644 | A | * | 11/2000 | Murray | 455/414.1 |
| 6,301,338 | B1 | * | 10/2001 | Makela et al. | 379/88.21 |
| 6,507,735 | B1 | * | 1/2003 | Baker et al. | 455/412.1 |
| 6,639,973 | B1 | * | 10/2003 | Wheeler et al. | 379/88.18 |
| 2002/0028674 | A1 | * | 3/2002 | Slettengren et al. | 455/422 |
| 2002/0055350 | A1 | * | 5/2002 | Gupte et al. | 455/412 |
| 2002/1005914 | | * | 5/2002 | Rosenhaft et al. | 705/77 |
| 2002/0076027 | A1 | * | 6/2002 | Bernnan et al. | 379/211.01 |
| 2002/0077135 | A1 | * | 6/2002 | Hyon | 455/466 |
| 2002/0128837 | A1 | * | 9/2002 | Morin | 704/255 |

FOREIGN PATENT DOCUMENTS

| KR | 101999003810 | 6/1999 |
|---|---|---|
| KR | 102001007434 | 8/2001 |

* cited by examiner

*Primary Examiner*—Vincent P Harper
*Assistant Examiner*—Ariel Balaoing
(74) *Attorney, Agent, or Firm*—The Farrell Law Firm, LLP

(57) ABSTRACT

A method for transmitting a character message from a mobile communication terminal with a function of transmitting the character message. Using the method, the character message can be transmitted promptly and conveniently upon failure of an originating call due to no reply of a receiver. The method comprises the steps of checking whether a preset "Send Message After Call Ending menu item" is chosen or not, as a user attempts to make a call to another mobile communication terminal, automatic ending the originating call, as the "Send Message After Call Ending menu item" is chosen, and converting the menu item into a screen for inputting a character message after ending the originating call, and performing origination of the character message according to the user's input.

2 Claims, 2 Drawing Sheets

METHOD FOR TRANSMITTING A CHARACTER MESSAGE FROM MOBILE COMMUNICATION TERMINAL

PRIORITY

This application claims priority to an application entitled "METHOD FOR TRANSMITTING A CHARACTER MESSAGE FROM MOBILE COMMUNICATION TERMINAL", filed in the Korean Industrial Property Office on Apr. 9, 2002 and assigned Ser. No. 2002-19151, the contents of which are hereby incorporated by reference.

BACKGROUND OF THE INVENTION

1. Field of the Invention

The present invention relates to a user interface of a mobile communication terminal, and more particularly to a method for transmitting a character message.

2. Description of the Related Art

Typically, when a user of a mobile communication terminal such as a cellular phone attempts to make a call to another mobile communication terminal, if the other party (i.e., receiving party) does not answer the call within a certain elapsed time, the mobile communication system offers an automatically converted voice mail function. Under this condition, if the user who attempts to make the call (that is, the calling party) leaves a voice message through the voice mail function, the receiving party can thereafter access a voice message through his/her own mobile communication terminal. The receiving party can thus listen to the voice message by calling to a voice mail center. The receiving party is required to pay the charge because he/she must call to the voice mail center to retrieve the message.

In view of this situation, the caller can alternatively send a character message to the receiving party using an SMS (Short Message Service), instead of leaving a voice message, when the call fails due to no reply of the receiving party. As a result, the receiving can check the message directly by use of his/her own mobile communication terminal performing SMS, without paying the charge to retrieve a voice message.

However, though it is possible to transmit the character message using the conventional mobile communication terminal, such a mobile terminal requires the caller to go through diverse complicated procedures in order to send the character message, upon failure of the originating call due to no reply by the receiving party. Thus, the user (calling party) first presses the end key or causes the originating call to end by closing the folder or flip, and enters the character message after looking for and choosing a character message menu item. The user then re-enters the other party's (receiving party's) phone number, which is the same number entered by the user upon an attempt to make the call. Thus, the user using the conventional mobile communication terminal has to go through a number of complicated steps to send a character message instead of a voice message.

SUMMARY OF THE INVENTION

Therefore, the present invention has been made in view of the above problems, and it is an object of the present invention to provide a method capable of transmitting a character message promptly and conveniently upon failure of an originating call due to no reply of a receiving party.

In accordance with the present invention, the above object can be accomplished by the provision of a method comprising the steps of: checking whether a preset "Send Message After Call Ending menu item" is chosen or not, while a user attempts to make a call to another mobile communication terminal; automatically ending the originating call if the "Send Message After Call Ending menu item" is chosen; and presenting a screen for inputting a character message after ending the originating call, and performing origination of the character message according to the user's input.

BRIEF DESCRIPTION OF THE DRAWINGS

The above object, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the annexed drawings. In the following description, a detailed description of known functions and configurations incorporated herein will be omitted for clarity.

Figure 1:
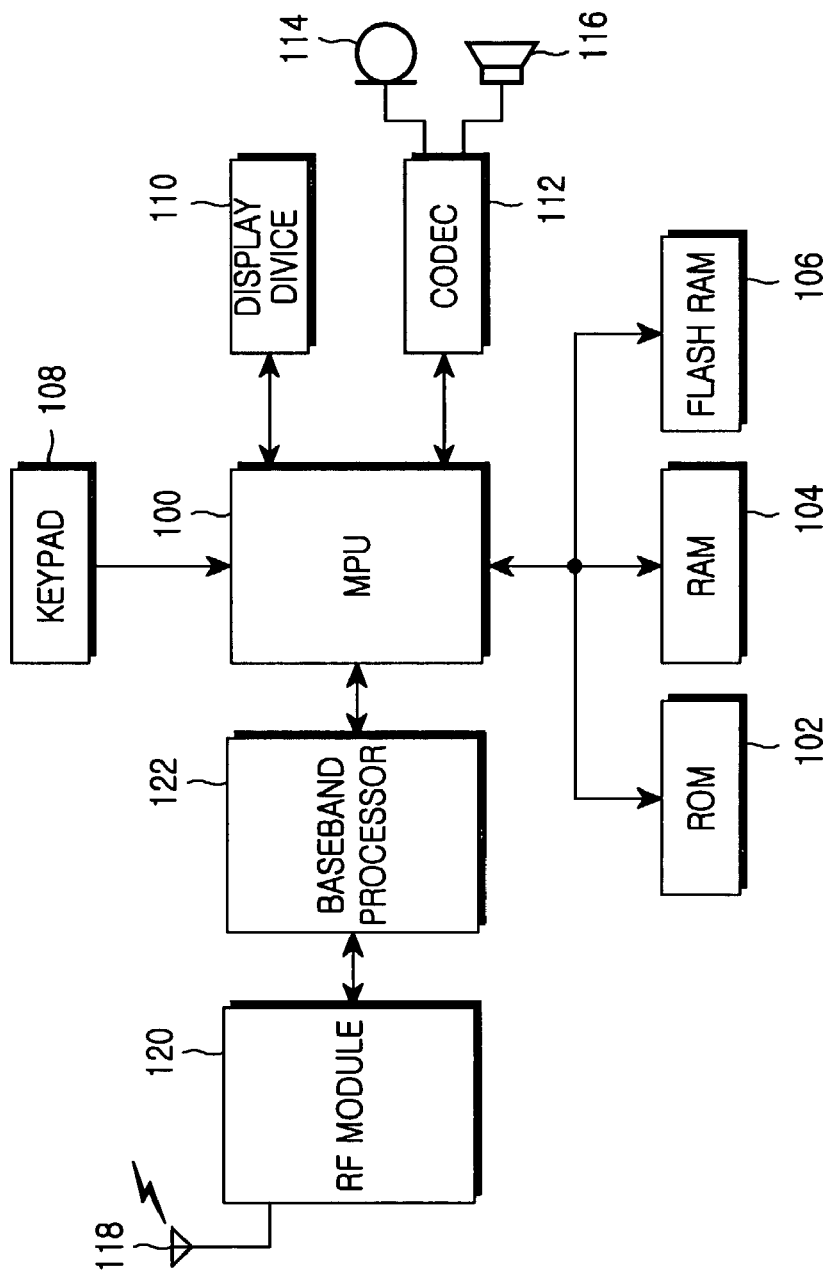
FIG. 1 is a block diagram showing a configuration of a mobile phone applied with the present invention.

FIG. 1 is an examplary embodiment of a mobile communication terminal in accordance with the invention comprised of a block diagram showing a configuration of a mobile phone with a character message transmission function.

In FIG. 1, MPU (Micro Processor Unit) 100 is a block for processing and controlling a phone call, a phone message, data communication, etc. In addition to such common functions, the MPU performs transmission of the character message according to the invention, as described below. ROM (Read Only Memory) 102 stores a microcode of a program for processing and controlling the MPU 100 and diverse reference data. RAM (Random Access Memory) 104 serves as a working memory of the MPU 100. Flash RAM 106 provides a space for storing diverse data for storage, which may be updated. A keypad 108 comprises multiple functional keys including number keys of 0~9, *, #, Menu, Message, Confirm, Call, Delete, Power/End, Volume, etc. The keypad provides key input data corresponding to the keys the user presses to the MPU 100. A display 110 displays picture information according to control performance of the MPU 100 on the screen. CODEC (Coder-Decoder) 112 connected to the MPU 100, and a microphone 114 and speaker 116, both being connected to the CODEC 112, comprise a voice inputting/outputting block used for the phone call and voice recording. RF (Radio Frequency) module 120 transmits and receives a radio signal via an antenna 118 from a base station of mobile phones. The RF module modulates the signal received from the MPU 100 through a baseband processor 122, and the RF signal is transmitted via the antenna 118. The RF module demodulates the RF signal received via the antenna 118 and transfers the demodulated signal to the MPU 100 through the baseband processor 122. The baseband processor 122 processes a baseband signal transmitted and received between the RF module 120 and the MPU 100.

In order to make the mobile phone able to transmit a character message promptly and conveniently upon failure of the originating call due to no reply of the receiver, as mentioned above, the invention includes a menu item which, when selected, automatically ends the originating call if not answered by the receiving party (for example after a certain number of rings or if voice mail picks up), so allowing the caller to input the character message and transmit the message. This menu item is herein referred to as a "Send Message After Call Ending" menu item. The "Send Message After Call Ending" menu item is, for example, set to allow the user to choose it by entering a Message key on the keypad 108 or entering other predefined keys when attempting to make the call.

Figure 2:
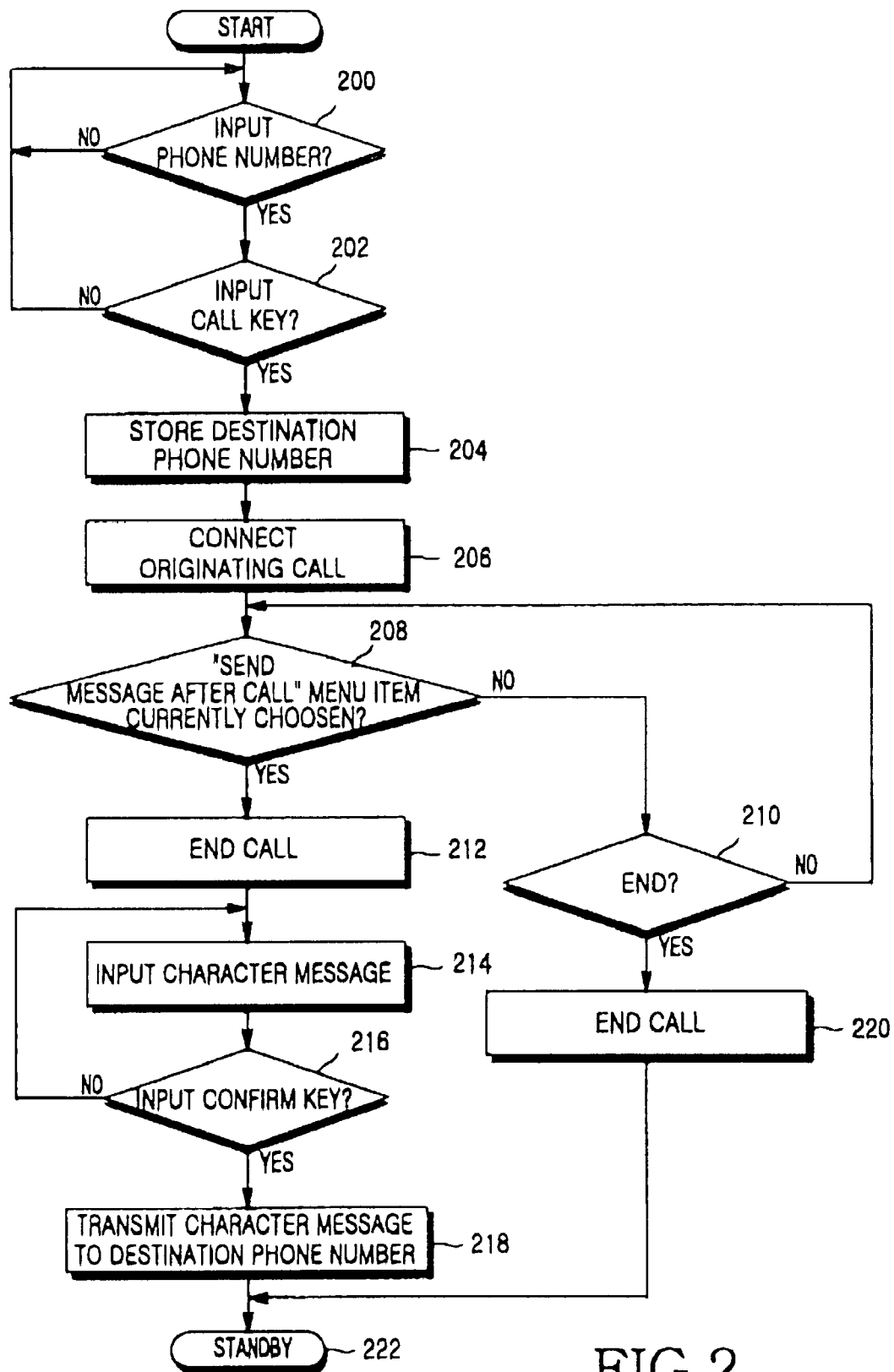
FIG. 2 is a process flow chart in accordance with the invention.

A description of a procedure for transmitting the character message according to the invention will be given, referring to a process flow chart of FIG. 2, which shows a procedure including steps 200 to 222 that the MPU 100 performs according to an embodiment of the invention. First, the user of the mobile phone of FIG. 1, who attempts to make a call as a caller, directly dials or speed dials a phone number of the other party, the receiving party, or employs a telephone directory function. After entering the phone number, the user enters the Call key on the keypad 108. The MPU 100 performs a step 204 in response to the above steps 200 to 202. The receiving party's phone number, which the caller enters as the above, is referred to hereinafter as a "destination phone number". The MPU 100 stores the destination phone number at step 204 and connects the originating call at step 206. At this time, the destination phone number is commonly stored in the flash memory 106, so the caller can confirm the phone number later. If the receiving party answers the call under the above situation, the call between the caller and the receiving party is achieved. On the other hand, if the receiving party does not answer the call because the phone is busy, a large number of rings occur without answer, the voice mail picks up, etc. the caller may commonly press the End key or close the flip or the folder, thereby causing the originating call to end.

The steps 200 to 206, as described above, are similar to a typical connecting process of originating calls. However, the steps 208 to 222 undergo a process different from the typical case. The MPU 100 checks whether the foregoing "Send Message After Call Ending" menu item is currently chosen or not, and checks whether the call ending is made or not. If the "Send Message After Call Ending" menu is not chosen in step 208 and caller presses the End key or closes the flip or the folder (step 210), the MPU 100 allows the originating call to end at step 220, and the MPU enters a standby mode at step 222, as in the typical case.

However, the steps 208 to 210 undergo a process different from the typical case. If the caller chooses "Send Message After Call Ending" menu item in step 208, the MPU 100 automatically ends the call at step 212 when MPU 100 determines that the receiving party will not answer the call. The MPU 100 may determine to end the call in step 212 if it detects a busy signal, a pre-determined number of rings take place without answer, the voice mail picks up, etc. The MPU thereafter presents the screen for inputting a character message and allows the caller to input the character message at step 214. Accordingly, in the case that the caller intends to send the character message upon no reply of the receiver, when attempting to make a call, it is not necessary for the caller to go through a separate procedure of ending the call and entering the Character Message menu.

At the step 216, when the caller enters the Confirm key on the keypad 108 after finishing input of the character message, the MPU performs the step 218. The MPU transmits the character message inputted by the caller at the step 218, to the destination phone number which is stored at the step 204, and the standby mode follows at step 222. Accordingly, in the case that the caller intends to send the character message to the receiving party upon no reply of the receiving party, when attempting to make a call, it is not necessary for the caller to enter the receiving party phone number again.

Therefore, in the case that the caller intends to send the character message upon no reply from the receiving party, when attempting to make a call, it is not necessary for the caller to go through separate procedures of ending the call and entering the Character Message menu and to enter again the receiving party phone number in order to send the character message.

Although the preferred embodiments of the present invention have been disclosed for illustrative purposes, those skilled in the art will appreciate that various modifications, additions and substitutions are possible, without departing from the scope and spirit of the invention. Especially, the embodiment of the invention discloses the case that the character message can be transmitted without re-inputting the other party's phone number, and further without going through the separate procedure of ending the call and looking for the Character Message menu item. Skipping such procedures offers promptness and convenience, compared to methods for transmitting character messages in conventional mobile communication terminals. Thus, the scope of the invention should be determined not by embodiments but by accompanying claims and equivalents thereof.

What is claimed is:

1. A method for transmitting a character message from a mobile communication terminal with a character message transmission function comprising the steps of:

entering a call key to originate a call to another mobile communication terminal;

storing a destination phone number in a flash memory of the mobile communication terminal when the destination call key has been entered;

checking, by the mobile communication terminal, whether a particular preset menu item is chosen by a user of the mobile communication terminal, during the originating call to the another mobile communication terminal;

automatically ending the originating call by the mobile communication terminal, when the particular preset menu item is chosen by the user of the mobile communication terminal; and presenting a screen for inputting a character message after ending the originating call, and performing origination of the character message using the destination phone number stored in the flash memory of the mobile communication terminal, wherein the preset menu item indicates, before the originating call ends, that the character message will be sent after the originating call ends.

2. The method as set forth in claim 1, wherein the step of performing origination of the character message includes the steps of:

inputting of the character message by the user, after presenting the screen for inputting a character message; and transmitting the inputted character message to a destination phone number, the number being that of the other mobile communication terminal.

* * * * *